United States Patent [19]

Winnik et al.

[11] Patent Number: 5,098,475
[45] Date of Patent: Mar. 24, 1992

[54] INKS WITH DENDRIMER COLORANTS

[75] Inventors: Francoise M. Winnik; Anthony R. Davidson, both of Toronto; Marcel P. Breton, Mississauga, all of Canada

[73] Assignee: Xerox Corporation, Stamford, Conn.

[21] Appl. No.: 646,904

[22] Filed: Jan. 28, 1991

[51] Int. Cl.$^5$ ............................................... C09D 11/00
[52] U.S. Cl. ........................................ 106/22; 106/20
[58] Field of Search .................... 106/22; 525/259; 528/405, 332, 418

[56] References Cited

U.S. PATENT DOCUMENTS

| | | | |
|---|---|---|---|
| 4,507,466 | 3/1985 | Tomalia et al. | 528/332 |
| 4,558,120 | 12/1985 | Tomalia et al. | 528/363 |
| 4,623,689 | 11/1986 | Shintani et al. | 524/457 |
| 4,631,327 | 12/1986 | Mehta | 526/256 |
| 4,664,708 | 5/1987 | Allen | 106/22 |
| 4,680,332 | 7/1987 | Hair et al. | 524/377 |
| 4,705,567 | 11/1987 | Hair et al. | 106/20 |
| 4,737,190 | 4/1988 | Shimada et al. | 106/22 |
| 4,791,165 | 12/1988 | Bearss et al. | 524/516 |
| 4,857,599 | 8/1989 | Tomalia et al. | 525/259 |
| 4,877,451 | 10/1989 | Winnik et al. | 106/23 |

OTHER PUBLICATIONS

U.S. Patent and Trademark Office database printout regarding "dendrimer".

*Primary Examiner*—William R. Dixon, Jr.
*Assistant Examiner*—Margaret V. Einsmann
*Attorney, Agent, or Firm*—E. O. Palazzo

[57] ABSTRACT

An ink composition comprising a solution with a dendrimer colored with a dye or dyes covalently attached thereto. As optional additives there may be included in the ink humectants and biocides. The aforementioned inks can be prepared by mixing the appropriate components such as a dendrimer, water and a reactive dye. Also disclosed is a process for the utilization of the aforementioned compositions and ink jet printing processes.

18 Claims, No Drawings

INKS WITH DENDRIMER COLORANTS

BACKGROUND OF THE INVENTION

The present invention is directed to ink compositions and imaging and printing processes thereof. More specifically, in one embodiment the present invention is directed to ink jet ink compositions comprised of a dendrimer core colored, including black, with a dye, or mixture of dyes covalently attached to the arms, or the arms, or branches, of the aforementioned dendrimer. One embodiment of the present invention is directed to an ink composition which comprises an aqueous liquid vehicle and a colored dendrimer, or dendricolorant, obtained by attaching a reactive dye or dyes to commercially available amino terminated, that is for example an amine group like $NH_2$ is attached to the end of the arm farthest removed in distance from the core, which dendrimers can be of the first, second, third, or n-th generation, wherein is a number of less than 9, and more specifically is a number of from about 1 to about 8, and wherein the attachment reaction can be accomplished at room temperature in water. The resulting dispersion of colored dendrimers can be formulated into an ink by the addition, for example, of a cosolvent comprised of water and a glycol, like diethyleneglycol, thereby improving latency, which is the maximum time period, for example less than one hour, and from about 1 to about 10 minutes, over which an uncapped ink jet printhead can remain idle before noticeable deterioration of its jetting performances, and this addition can improve ink drying time, that is the time needed for an ink jet print to dry an extent such that it will not smear or offset upon handling or when placed in contact with another sheet of paper, which drying time can, for example, be less than one minute, or more specifically from about 10 to about 30 seconds. Also, the addition of glycol permits the adjustments of the ink viscosity from about 1.1 to about 4 centipoise, and preferably from about 1.1 to about 3.0 centipoise, and can permit adjustment of the ink surface tension. Viscosity and surface tensions are major contributing factors in the production of excellent quality prints on plain papers, that is prints with acceptable edge acuity, that is the sharpness of the image between the printed and nonprinted areas, minimal ink feathering on paper, high optical density, and characterized, for example, by no mottle in solid areas, or a desirable uniformity of solid area ink coverage. The effects of the ink surface tension and viscosity on the penetrability of the ink in a paper can be estimated by the Lucas-Washburn penetrability coefficient which is defined by $(\gamma \cos \theta)/\eta$, where $\gamma$ and $\eta$ are the surface tension and the viscosity, respectively, of the ink which is absorbed on the paper and $\theta$ is the contact angle between the ink and the paper. Advantages of inks associated with the present invention in embodiments thereof include the preselection of the colors desired; excellent color intensity of the prints and images developed; control of the physical characteristics of the core by the selection of the dendrimer; the selection of the physical characteristics of the core including, for example its diameter, its hydrophobicity, and the chemical functionality of its surface allows the control of parameters, such as level of dye incorporation in the dendricolorant, the jettability of an ink comprised of these colorants; the generation of prints with excellent, usually the higher the optical density the darker the image, that is for example the image is substantially uniform in color, optical density, of from about 0.8 to about 1.5, depending on the color of the ink; excellent waterfastness of, for example, from about 80 to about 98 percent; resistance to highlighter marking; formation of clear images on transparencies; the use of a variety of plain papers, such as Xerox Corporation 4024® paper for ink jet printing; and the like. The inks of the present invention can be selected for a number of known ink jet printing methods and apparatus, including thermal ink jet, or bubble jet processes as described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of which are totally incorporated herein by reference.

Ink jet printing systems can generally be classified by two types: continuous stream and drop-on-demand. In continuous stream ink jet systems, ink is emitted in a continuous stream under pressure through at least one orifice or nozzle. The stream is perturbed causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet. With this type, there are apparently generated high velocity droplets and there is allowed very close spacing of the nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction toward a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known as indicated herein, and are described, for example, in U.S. Pat. Nos. 4,601,777; 4,251,824; 4,410,899; 4,412,224; and 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of the dyes contained in inks may be potentially toxic or mutagenic. These problems can be minimized by replacing the dyes used in ink formulations with insoluble pigments. In general, pigments are superior to dyes with respect to waterfastness, lightfastness, image density, thermal stability, oxidative stability, the ability to perform intercolor ink mixing, compatibility with both coated/treated and plain papers, image edge acuity, reduced image feathering, and nontoxic and nonmutagenic properties.

Heterophase ink jet inks are known. For example, U.S. Pat. No. 4,705,567, the disclosure of which is totally incorporated herein by reference, discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 4,877,451 (Winnik et al.), the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, copending application U.S. Ser. No. 07/369,003, the disclosure of which is totally incorporated herein by reference, there are illustrated ink jet inks and liquid developers containing colored particles comprising hydrophilic porous silica particles to the surfaces of which dyes are covalently bonded through silane coupling agents. The ink compositions of this patent are believed to be less stable in the printheads, and less stable during storage, disadvantages avoided, or minimized with the inks of the present invention.

In a patentability search report the following United States patents were recited: U.S. Pat. No. 4,705,567 relating, for example, to heterophase ink compositions comprised of water and a dye covalently attached to a polyethylene glycol, or polyethylene imine component, which component is complexed with a heteropolyanion; U.S. Pat. No. 4,623,689 which discloses, for example, an ink for ink jet recording wherein the ink contains a certain aqueous colored polymer, see the Abstract for example; and as collateral interest U.S. Pat. Nos. 4,664,708, 4,680,332, and 4,791,165. The disclosures of the aforementioned patents, and all other patents mentioned herein are totally incorporated herein by reference.

Copending application U.S. Ser. No. 544,564, the disclosure of which is totally incorporated herein by reference, relates, for example, to ink compositions which comprise an aqueous liquid vehicle and colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles. In a specific embodiment of the copending application, the colored particles comprise micelles of block copolymers of the formula ABA having silica precipitated therein and dye molecules covalently attached to the micelles. Another embodiment of the copending application is directed to a printing process which comprises incorporating the ink thereof into an ink jet printing apparatus and causing droplets of the ink to be ejected in an imagewise pattern onto a substrate, thereby generating images on the substrate. Also, in another embodiment of the copending application there is disclosed an ink preparation process which comprises, in the order stated, (1) adding to water a block copolymer of the formula ABA, wherein A represents a hydrophilic segment and B represents a hydrophobic segment, thereby forming a dispersion of micelles of the block copolymer; (2) adding a water-soluble base to the dispersion, thereby bringing the pH of the dispersion to at least 8; (3) adding to the dispersion a solution comprising water and a reactive dye capable of reacting with the block copolymer, thereby forming colored polymeric micelles; and (4) admixing the colored micelles with an aqueous liquid vehicle to form an ink composition.

Heterophase inks containing pigment particles as colorants, however, also exhibit difficulties. For example, the particulate colorant may exhibit a tendency to settle out or separate from the liquid vehicle, particularly when the ink is stored for long periods of time. In addition, inks containing pigment particles as colorants tend to be opaque instead of transparent, which reduces their usefulness for printing images on transparencies for the purpose of overhead projection. Further, inks containing pigment particles as colorants tend to clog the narrow orifices of the printhead resulting in deterioration of the print quality. These and other disadvantages, such as poor resistance to rubbing, by another substrate or by hand are avoided, or minimized with the inks of the present invention.

While ink compositions are known a need remains for ink compositions exhibiting advantages of both dye-based inks and pigment-based inks. There is also a need for ink compositions with excellent waterfastness characteristics. A need also remains for ink compositions exhibiting acceptable lightfastness characteristics. Further, there is a need for ink compositions that are nontoxic and nonmutagenic. In addition, a need exists for ink compositions for which a wide variety of color choices exists. There is also a need for ink compositions that can be prepared by simple and economical processes. Further, there is a need for ink compositions suitable for printing on plain papers, coated or treated papers, and transparency materials. In addition, there is a need for ink compositions that when printed on substrates exhibit excellent optical density, low feathering, for example there is minimal undesirable bleeding of the ink in areas adjacent to the printed images, and excellent rub resistance, for example after strong hand rubbing for an extended period of time, about up to three minutes, the image is not removed or disturbed. There is also a need for ink compositions that when used to print on transparency materials generate images that project their original colors when light is passed through the image. A need also remains for ink compositions with acceptable thermal stability, for example the inks are not substantially adversely effected in the printhead by heat, and storage stability. Further, there is a need for ink compositions suitable for ink jet printing that do not induce clogging of the printhead. A need also remains for ink compositions that when printed on substrates exhibit no undesirable intercolor bleeding between areas of different color.

SUMMARY OF THE INVENTION

It is a feature of the present invention to provide ink compositions with many of the advantages illustrated herein.

It is another feature of the present invention to provide ink compositions with excellent waterfastness characteristics.

It is yet another feature of the present invention to provide ink compositions exhibiting acceptable lightfastness characteristics.

It is still another feature of the present invention to provide ink compositions that are nontoxic and nonmutagenic.

Another feature of the present invention is to provide ink compositions for which a wide variety of color choices exists.

Yet another feature of the present invention is to provide ink compositions that can be prepared by simple and economical processes.

Still another feature of the present invention is to provide ink compositions with colorants comprised of a dendrimer core colored with a dye, or dyes covalently attached to the arms of the dendrimers.

It is another feature of the present invention to provide ink compositions suitable for printing on plain papers, coated or treated papers, and transparency materials.

It is yet another feature of the present invention to provide ink compositions that when printed on substrates exhibit excellent optical density, low feathering, and excellent rub resistance.

Additionally, another feature of the present invention is to provide ink compositions that when used to print on transparency materials generate images that project their original colors when light is passed through the image.

Another feature of the present invention is to provide ink compositions with acceptable thermal and storage stability.

Moreover, another feature of the present invention is to provide ink compositions suitable for ink jet printing, which inks do not induce, or minimize clogging of the ink printheads.

Also, another feature of the present invention is to provide ink compositions that when printed on substrates exhibit minimal, or no undesirable intercolor bleeding between areas of different color.

These and other features of the present invention can be accomplished in embodiments thereof by providing an ink composition which comprises an aqueous liquid vehicle and colored particles comprised of a dendrimer core colored with a dye, or dyes covalently attached thereto. In one embodiment the inks of the present invention are comprised of a solution comprised of a dendrimer with a colored dye, or colored dyes, covalently attached thereto. The aforementioned solution usually contains water, and as optional additive components known humectants, and known biocides.

Dendrimers are known, and can be considered radially symmetrical molecules of a starburst topology comprised of an initiator core, such as nitrogen, ethylenediimine, and the like, interior layers attached to the core and comprised of, for example, three or four arms, each arm being composed of repeating units, with the number of repeating units in each arm being considered the generation of the dendrimer, and terminal functional groups functionality, such as, for example, a primary amine attached to the outermost generation, which dendrimers are illustrated, for example, in U.S. Pat. Nos. 4,507,466; 4,631,337; 4,558,120; 4,568,737 and 4,587,329; and in D. A. Tomalia, A. M. Naylor, and W. A. Goddard III, *Angewandte Chemie, Int.* Ed. Engl. 29, 138 (1990), the disclosures of which are totally incorporated herein by reference. The size and shape of the starburst dendrimer molecule and the functional groups present in the dendrimer molecule can be controlled by the choice of the initiator core, the number of generations, and the choice of repeating units employed at each generation. The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl)ethane, 1,1,1-tris-(4'-hydroxyphenyl)-ethane, polyfunctional amines, such as ethylene diamine, linear polyethyleneimines, and the like. The chemical functionality of the repeating unit in the interior layers can include, for example, amidoamines, such as amino-ethyl acetamide, imines, such as diethylene diimine, or ethers such as those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Repetition of the two-step procedure leads to subsequent generations. An alternate synthetic route uses a convergent growth synthesis as described in detail in C. J. Hawker and J. M. J. Fréchet, *J. Am. Chem. Soc.*, 112,7638 (1990), the disclosure of which is totally incorporated herein by reference. Examples of dendrimers prepared by the divergent approach include the STARBURST ® available from Dow Chemical Company, Dendrimer Microparticles available from Polysciences, Inc., in which the terminal functional groups are primary amino groups, and which range in average diameter of from about 10.8 Angstroms (first generation) to about 83.9 Angstroms (8th generation).

Yet another embodiment of the present invention is directed to an ink preparation process which comprises (1) preparing by mixing a solution in water of a STARBURST ® dendrimer, which solution contains from about 0.5 to 10 percent by weight of STARBURST ® dendrimers, and from about 99.5 to about 90 weight percent of water; (2) adding to the resulting solution, about 10 to about 60 weight percent, a second solution, from about 40 to about 90 percent by weight, comprising water, from about 80 to about 98 weight percent, and a reactive dye, from about 2 to about 20 weight percent, capable of reacting with the dendrimer, thereby forming colored dendrimers or dendricolorants; and (3) admixing from about 10 to about 30 weight percent of the colored dendrimers with from about 70 about 90 percent by weight of an aqueous liquid vehicle, such as for example water and glycol, to form an ink composition. Also, known ink additives, such as biocides, humectant, and the like can be added to the formed ink.

Another embodiment of the present invention is directed to a printing process which comprises incorporating an ink of the present invention into an ink jet printing apparatus and causing droplets of the ink to be ejected in an imagewise pattern onto a substrate, thereby generating images on the substrate.

The liquid vehicle of the inks of the present invention can be comprised of various known components, such as water, a mixture of water and a miscible organic component, such as a glycol, like ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water and the humectants, generally posess absorption characteristics on paper and evaporation properties allowing for the desired ink jet printing speed when the ink is to be used in an ink jet printing process. With the inks of the present invention in embodiments, the liquid vehicle can be present in an amount of from about 85 to about 99.5 percent by weight, and preferably from about 90 to about 99 percent by weight.

Optional known additives can be present in the inks of the present invention as indicated herein, such as biocides like DOWICIL TM 150, 200, and 75, benzoate salts, sorbate salts, and the like, present in an effective amount of, for example, from about 0.0001 to about 4 percent by weight, and preferably from about 0.01 to about 2.0 percent by weight; humectants such as ethylene glycol, diethyleneglycol, N-methylpyrolidinone, propylene glycol, hydroxyethers, ethers, amides, sulfoxides, ketones, lactones, esters, alcohols, and the like, present in an effective amount of, for example, from 0 to about 50 percent by weight, and preferably from about 5 to about 40 percent by weight, pH controlling agents such as acids or bases, phosphate salts, carboxylates salts, sulfite salts, amine salts, and the like, present in an amount of from 0 to about 1 percent by weight and preferably from about 0.01 to about 1 percent by weight, or the like.

To prepare the colored dendrimers in an embodiment, a selected STARBURST TM dendrimer, generally in a concentration of from about 0.05 percent by weight to about 10 percent by weight, and preferably from about 1 percent by weight to about 5 percent by weight, and preferably of a first or third generation, is admixed with water, preferably water that has been distilled or deionized, to obtain a clear solution. Subsequently, a solution, about 5 milliliters in an embodiment, of a reactive dye dissolved in water typically at a concentration of from about 1 to about 30 percent by weight is added to the clear solution, generally at room temperature, about 25° C., typically in an amount such that the relative amount of dendrimers is from about 10 to about 50 percent by weight of the dye. When the reaction between the dye and the STARBURST TM dendrimers has been completed, typically within about 24 hours, the mixture resulting, which may be purified to remove, for example, unreacted dye, excess dye, and the like, is added to an aqueous ink vehicle to form the ink. The aforementioned purification can be accomplished by various known techniques such as ultrafiltration, size exclusion chromatography, or electrophoresis.

Examples of dyes selected for the inks of the present invention generally include any known dyes, such as the Reactive Dyes. These dyes typically comprise a chromophore soluble in water, such as an anthraquinone, a monoazo dye, a disazo dye, a phthalocyanine, an aza[18]annulene, a formazan copper complex, a triphenodioxazine, and the like, to which is covalently attached a reactive group, such as a dichlorotriazine, a monochlorotriazine, a dichloroquinoxaline, an aminoepoxide, a mono-(m-carboxypyridinium)-triazine, a 2,4,5-trihalogenopyrimidine, a 2,4-dichloropyrimidine, a 2,3-dichloroquinoxaline, a monofluorotriazine, a 4,5-dichloro-6-methyl-2-methylsulfonylpyrimidine, a 1,4-dichlorophthalazine, a chlorobenzothiazole, a sulfatoethylsulfone, a $\beta$-chloroethylsulfone, a 4,5-dichloro-6-pyridazone, an $\alpha$-bromoacryloylamido, an $\alpha,\beta$-dibromopropionylamido, and the like. Examples of suitable dyes include Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, Duasyn Black RL-SF, Duasyn Brilliant Yellow GL-SF, Duasyn Brilliant Red F3B-SF, and Duasyn Red 3B-SF, available from Hoechst, Reactive Yellow 86, available from Sigma Chemical Company, Reactive Black 5, Reactive Blue 4, Reactive Blue 15, Reactive Orange 16, Reactive Red 4, and Reactive Yellow 2 available from Aldrich Chemical Company Incorporated, and the like. One dye or mixtures thereof may be selected in embodiments of the present invention.

The colored dendrimers can have dye molecules attached to their surface in any amount sufficient to impart to the dendrimers the desired intensity and hue of color. Typically, the colored dendrimers contain the dye in an amount of from about 10 to about 90 percent by weight, and preferably from about 20 to about 80 percent by weight.

Ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the Diablo C150 IJ ™ printer, Hewlett Packard Desk Jet ™ printers, the Diablo C150 TIJ ™ printer, or the like. Particularly preferred is a thermal ink jet printing apparatus. The inks of the present invention can be used to form images on a wide variety of substrates, including plain paper such as Xerox 4024 ® paper, bond paper such as Gilbert ® 25 percent cotton bond paper or Gilbert ® 100 percent cotton bond paper, silica coated papers, transparency materials, fabrics, plastics, polymeric films, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

There was prepared an ink from a first generation dendrimer as follows: Procion Turquoise H-7G, 141 milligrams, obtained from Imperial Chemicals Incorporated was added to 5 milliliters of a stirred solution of a 1 percent solution in water of STARBURST ™ dendrimer of the first generation, obtained from Polysciences Incorporated, which dendrimer has a diameter of 10.8 Angstroms and 6 amino groups on its surface, which solution was retained under an atmosphere of argon gas in a 10 milliliter round bottom flask at room temperature, about 25° C. The aforementioned mixture was stirred with a magnetic stirrer for 17 hours at 25° C. Thereafter, thin layer chromatography analysis of the mixture was accomplished on reversed phase plates LKC18F, available from Whatman Chemical Separation Incorporated, eluted with a water/methanol mixture, 20 percent v/v (volume/volume), and this analysis evidenced that the Procion Turquoise H-7G dye was covalently attached to the dendrimer. An ink was then formulated by adding to 5 milliliters of the obtained mixture 0.24 milliliter of diethylene glycol. The mixture was filtered through a 0.45 micron filter. There resulted a cyan dendricolor-1 (first generation) ink comprised of 3.5 percent by weight of a cyan dendricolorant, 91.5 percent by weight of water, and 5.0 percent by weight of diethylene glycol. The cyan ink thus prepared was incorporated in a Desk Jet ™ Hewlett Packard ink jet printer. Prints were formed on plain papers (Xerox 4024 ® #14, 16, and 19) obtained from Xerox Corporation, on silica coated FC-3 paper, obtained from Jujo Inc. of Japan, and on a transparency material 3R3351, obtained from Xerox Corporation. In each instance the cyan prints obtained exhibited solid areas of acceptable optical density as measured with a Macbeth TR927 Optical Densitometer (1.55 on coated paper, 1.22 on Xerox 4024 ® #16 paper/felt side, 1.10 on Xerox 4024 ® #16 paper/wire side, and 2.47 on transparency). Feathering, the bleeding of ink from printed areas to nonprinted areas, or the sharpness of the edges of solid printed areas as observed by visual inspection, with the aid of an optical microscope was minimal on both the felt side and the wire side of the uncoated paper. In addition, the prints on the Xerox 4024 ® #14 paper exhibited a waterfastness of 85.6 percent (0.83 divided by 0.97 multiplied by 100), as determined by cutting a printed solid area on Xerox 4024 ® paper (wire side) into two sheets, soaking one sheet in water for 2 minutes, air drying the soaked sheets for 24 hours at ambient temperature, and measuring the optical densities of both the soaked and unsoaked sheets. The optical density of the sheet that was not soaked in water was 0.97 and the optical density of the sheet soaked in water was 0.83.

EXAMPLE II

There was prepared a cyan ink from a third generation dendrimer as follows: Procion Turquoise H-7G, 141 milligrams, obtained from Imperial Chemicals Incorporated was added to 5 milliliters of a stirred solution of a 1 percent solution in water of STARBURST TM dendrimer of the third generation, obtained from Polysciences Incorporated, which dendrimer has a diameter of 22.0 Angstroms and 24 amino groups on the end of the dendrimer arm. The aforementioned 1 percent solution in water was retained under an atmosphere of argon gas in a 10 milliliter round bottom flask at room temperature, about 25° C. The aforementioned mixture was stirred with a magnetic stirrer for 17 hours at 25° C. Thereafter, thin layer chromatography analysis of the mixture was accomplished on reversed phase plates LKC18F, available from Whatman Chemical Separation Incorporated, eluted with a water/methanol mixture 20 percent v/v (volume/volume) and this analysis evidenced that the Procion Turquoise H-7G dye was covalently attached to the dendrimer. An ink was then formulated by adding to 5 milliliters of the obtained mixture 0.24 milliliter of diethylene glycol. The mixture was filtered through a 0.45 micron filter. There resulted a cyan dendricolor-1 ink comprised of 3.4 percent by weight of a cyan dendricolorant, 91.6 percent by weight of water, and 5.0 percent by weight of diethylene glycol. The cyan ink thus prepared was incorporated in a Desk Jet TM Hewlett Packard ink jet printer. Prints were formed on plain paper (Xerox 4024 ® #14 paper, obtained from Xerox Corporation), on silica coated paper FC-3 (obtained from Jujo). In each instance, the cyan prints obtained exhibited solid areas of acceptable optical density as measured with a Macbeth TR927 Optical Densitometer (1.28 on coated paper, 0.89 on 4024 #14 paper/felt side, 1.01 on 4024 #14 paper/wire side). Feathering, as observed by visual inspection with the aid of an optical microscope, of the sharpness of the edges of solid printed areas was minimal on both the felt side and the wire side of the uncoated paper. In addition, the prints on the Xerox 4024 ® #14 paper exhibited a waterfastness of 95 percent as determined by cutting a printed solid area on Xerox 4024 ® #14 paper (wire side) into two sheets, soaking one sheet in water for 2 minutes, air drying the soaked sheets for 24 hours at ambient temperature, and measuring the optical densities of both the soaked and unsoaked sheets. The optical density of the sheet that was not soaked in water was 1.07 and the optical density of the sheet soaked in water was 1.02.

EXAMPLE III

There was prepared a magenta ink from a first generation dendrimer as follows: a solution of Levafix Brilliant Red EGBA, 2.124 grams, obtained from Bayer Inc. of Germany, in 7.9 milliliters of water was retained under an atmosphere of argon gas in a 25 milliliter pear-shaped flask at room temperature, about 25° C. To the stirred solution were added 7.5 milliliters of a 10 percent solution in water of STARBURST TM dendrimer of the first generation, obtained from the Michigan Macromolecular Institute, which dendrimer has a diameter of 10.8 Angstroms and 6 amino groups on its surface. The aforementioned mixture was stirred with a magnetic stirrer for 17 hours at 25° C. Thereafter, thin layer chromatography analysis of the mixture was accomplished on reversed phase plates LKC18F, available from Whatman Chemical Separation Incorporated, eluted with a water/methanol mixture, 20 percent v/v (volume/volume), and this analysis evidenced that the Levafix Brilliant Red EGBA dye was covalently attached to the dendrimer. An ink was then formulated by adding to 2.44 milliliters of the obtained mixture 0.61 milliliter of diethylene glycol and 9.18 milliliters of water. The mixture was filtered through a 0.45 micron filter. There resulted a magenta dendricolor ink comprised of 3.3 percent by weight of a magenta dendricolorant, 91.7 percent by weight of water, and 5 percent by weight of diethylene glycol. The magenta ink thus prepared was incorporated in a Desk Jet Plus TM Hewlett Packard ink jet printer. Prints were formed on paper (Xerox 4024 ® #14 paper, obtained from Xerox Corporation). The magenta prints obtained exhibited solid areas of acceptable optical density as measured with a Macbeth TR927 Optical Densitometer (0.84 on Xerox 4024 ® paper/wire side). Feathering, as observed by visual inspection with the aid of an optical microscope, of the sharpness of the edges of solid printed areas was minimal on both the felt side and the wire side of the uncoated paper. In addition, the prints on the Xerox 4024 ® paper exhibited a waterfastness of 93 percent as determined by cutting a printed solid area on Xerox 4024 ® paper (wire side) into two sheets, soaking one sheet in water for 2 minutes, air drying the soaked sheets for 24 hours at ambient temperature, and measuring the optical densities of both the soaked and unsoaked sheets. The optical density of the sheet that was not soaked in water was 0.84 and the optical density of the sheet soaked in water was 0.78.

EXAMPLE IV

There was prepared a black ink from a first generation dendrimer as follows: a solution of Duasyn Black RL-SF, 2.188 grams, obtained from Hoechst, in 7.7 milliliters of water was retained under an atmosphere of argon gas in a 25 milliliter pear-shaped flask at room temperature, about 25° C. To the stirred solution were added 7.7 milliliters of a 10 percent solution in water of STARBURST TM dendrimer of the first generation, obtained from the Michigan Macromolecular Institute, which dendrimer has a diameter of 10.8 Angstroms and 6 amino groups on its surface. The aforementioned mixture was stirred with a magnetic stirrer for 17 hours at 25° C. Thereafter, thin layer chromatography analysis of the mixture was accomplished on reversed phase plates LKC18F, available from Whatman Chemical Separation Incorporated, eluted with a water/methanol mixture, 20 percent v/v (volume/volume), and this analysis evidenced that the Duasyn Black RL-SF dye was covalently attached to the dendrimer. An ink was then formulated by adding to 1.05 milliliters of the obtained mixture 0.24 milliliter of diethylene glycol and 3.92 milliliters of water. The mixture was filtered through a 0.45 micron filter. There resulted a black dendricolor-1 ink comprised of 3.4 percent by weight of a black dendricolorant, 91.6 percent by weight of water, and 5 percent by weight of diethylene glycol. The black ink thus prepared was incorporated in a Desk Jet Plus TM Hewlett Packard ink jet printer. Prints were formed on Xerox 4024 ® #14 paper (obtained from Xerox Corporation). The black prints obtained exhibited solid areas of acceptable optical density as measured with a Macbeth TR927 Optical Densitometer (0.97 on Xerox 4024 ® paper/wire side). Feathering, as observed by visual inspection with the aid of an optical microscope, of the sharpness of the edges of solid printed areas was minimal on both the felt side and the wire side of the uncoated paper. In addition, the prints on the Xerox 4024 ® paper exhibited a waterfastness of 85 percent as determined by cutting a printed solid area on Xerox 4024 ® paper (wire side) into two sheets, soaking one sheet in water for 2 minutes, air drying the soaked sheets for 24 hours at ambient temperature, and measuring the optical densities of both the soaked and unsoaked sheets. The optical density of the sheet that was not soaked in water was 0.97 and the optical density of the sheet soaked in water was 0.82.

Other embodiments and modifications of the present invention may occur to those skilled in the art subsequent to a review of the information presented herein; these embodiments and modifications, as well as equivalents thereof, are also included within the scope of this invention.

What is claimed is:

1. An aqueous ink composition comprising a solution of a dendrimer colored with a dye or dyes covalently attached thereto.

2. An ink in accordance with claim 1 wherein the solution contains water, and three different dye colors.

3. An ink in accordance with claim 1 wherein the solution contains water, a humectant, and a biocide.

4. An ink in accordance with claim 1 wherein the dendrimer is a first, second or third generation dendrimer.

5. An ink in accordance with claim 1 wherein the dendrimer is microparticle of the first generation with an average diameter of about 10.8 Angstroms, and with 6 terminal amino groups.

6. An ink in accordance with claim 1 wherein the dendrimer is a microparticle of the third generation with an average diameter of about 22 Angstroms and with 24 terminal amino groups.

7. An ink in accordance with claim 1 wherein the dye or dyes are selected from Reactive dyes.

8. An ink in accordance with claim 1 wherein the dye is selected from the group consisting of anthraquinones, monoazo dyes, disazo dyes, phthalocyanines, aza[18]annulenes, formazan copper complexes, and triphenodioxazines, to which are covalently attached reactive groups.

9. An ink in accordance with claim 1 wherein the dye comprises a reactive group selected from the group consisting of dichlorotriazines, monochlorotriazines, dichloroquinoxalines, aminoepoxides, mono-(m-carboxypyridinium)-triazines, 2,4,5-trihalogenopyrimidines, 2,4-dichloropyrimidines, 2,3-dichloroquinoxalines, monofluorotriazines, 4,5-dichloro-6-methyl-2-methylsulfonylpyrimidines, 1,4-dichlorophthalazines, chlorobenzo-thiazoles, sulfatoethylsulfones, $\beta$-chloroethylsulfones, 4,5-dichloro-6-pyridazones, $\alpha$-bromoacryloylamidos, and $\alpha,\beta$-dibromopropionylamidos.

10. An ink in accordance with claim 1 wherein the dye is present in an amount of about 0.5 to about 10 percent by weight, the dendrimer is present in an amount of about 1 to about 15 percent by weight, and the solution contains water in an amount of from about 75 to about 98.5 percent by weight.

11. An ink in accordance with claim 1 wherein the dye is present in an amount of about 2 to about 7 percent by weight, the dendrimer is present in an amount of from about 2 to about 13 percent by weight, and the solution contains water in an amount of from about 96 to about 80 percent by weight.

12. An ink in accordance with claim 3 wherein the humectant is present in the amount of from about 2 to about 50 percent by weight.

13. An ink in accordance with claim 12 wherein the humectant is a glycol.

14. An ink in accordance with claim 12 wherein the humectant is a glycol selected from the group consisting of ethylene glycol, propylene glycol, diethylene glycol, and mixtures thereof.

15. An ink in accordance with claim 12 wherein the biocide is present in the amount of from about 0.02 to about 0.1 percent by weight.

16. An ink composition comprised of a solution of water, and a dendrimer colored with a dye attached thereto.

17. An ink in accordance with claim 16 wherein the solution contains a biocide, and a humectant.

18. An ink in accordance with claim 2 wherein distilled water or deionized water is selected.

* * * * *